UNITED STATES PATENT OFFICE.

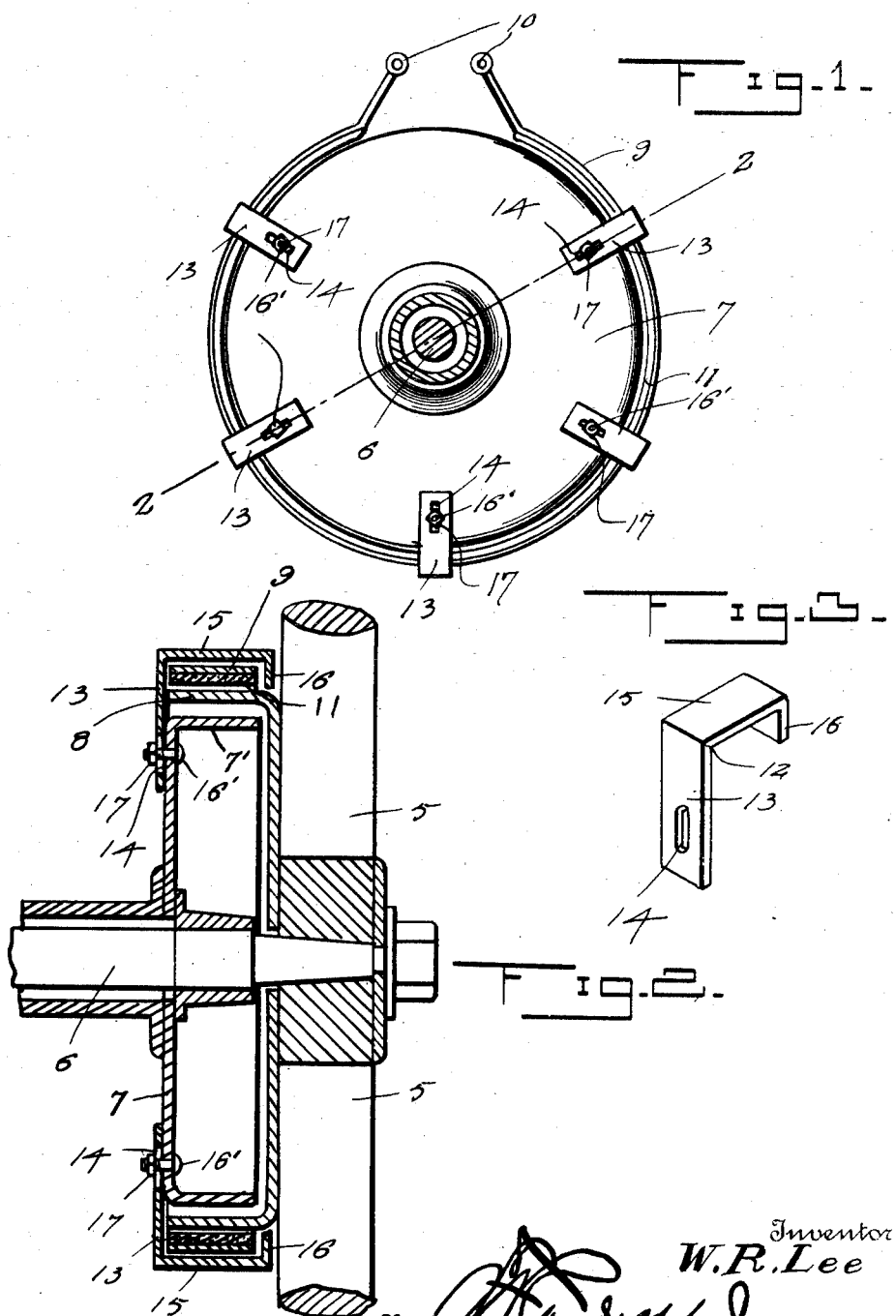

WILLIAM R. LEE, OF FRESNO, CALIFORNIA.

BRAKE.

1,365,925.  Specification of Letters Patent.  Patented Jan. 18, 1921.

Application filed July 10, 1918. Serial No. 244,280.

*To all whom it may concern:*

Be it known that I, WILLIAM R. LEE, a citizen of the United States, residing at Fresno, in the county of Fresno and State of California, have invented certain new and useful Improvements in Brakes; and I do hereby declare the following to be a full, clear, and exact description of the invention, such as will enable others skilled in the art to which it appertains to make and use the same.

My invention relates to improvements in brakes and has particular reference to brakes for use on automobiles.

An object of the invention is to provide a friction band brake mechanism of simple and durable structure having its parts arranged and assembled so that they brace each other and serve to maintain the predetermined arrangement of the parts to render the brake efficient in its action and positive and reliable in operation.

In the accompanying drawings forming a part of this specification and in which like numerals are employed to designate like parts throughout the same.

Figure 1 is a side elevation of a brake and associated elements, showing my improved brake clip applied thereto, Fig. 2 is a transverse section taken on line 2—2 of Fig. 1, and, Fig. 3 is a perspective of a clip or bracket adapted for attachment to the brake drum for adjusting the brake thereon.

The structure to which the brake mechanism is applied includes a wheel 5 mounted upon an axle 6 in a usual manner. A disk 7 is fixed to the axle 6 and is provided at its periphery with an angularly disposed annular flange 7'. A brake band 9 surrounds the peripheral portion 8 of a drum which is concentrically mounted upon the wheel 5. The band 9 is provided at its end with eyes 10 of usual pattern. A lining 11 is applied to the band 9 and is interposed between the said band and the drum flange 8. The disk 7 is located within the flange 8 of the drum. The brake mechanism further includes bracket members indicated in general at 12. The bracket members are composed of shanks 13 having slots 14, intermediate portions 15 and angularly disposed end portions 16. Bolts 16' pass transversely through the disk 7 and pass through the slots 14 of the bracket members. Nuts 17 are screwed upon the bolts 16' and serving to hold the bracket members in position upon the disk. The intermediate portion 15 of the bracket members are disposed transversely across the band 9 and the end portions 16 of the brackets are disposed transversely across the edge of the band. The bracket members 12 are attached to the disk 7 at the side thereof opposite that side at which the flange 7' is disposed, therefore the flange 7' of the disk braces the peripheral portion of the disk and retains the brackets at their predetermined adjusted position with relation to the drum and in the event that the band is forced into contact with the brackets when the brake is operated.

In adjusting my improved brake device, the lining is spaced slightly from the drum, thus requiring but little movement of the brake pedal, to bring the lining firmly in engagement with face of the brake drum.

While I have shown and described the preferred embodiment of my invention, it is understood that I may make such minor changes in arrangement and construction of parts as will remain within the spirit of the invention and the appended claim.

Having thus described my invention, what I claim is:

A brake comprising a drum, a brake band surrounding the drum, a disk located within the drum and having an annular flange which is housed within the drum, L-shaped brackets mounted upon the disk for adjustment radially thereof, means for securing the brackets at adjusted positions, the brackets having end portions which are disposed transversely across the band and being provided with extremities which are disposed at the side edge of the band, the brackets being attached to the disk at the side thereof opposite the side beyond which the flange of the disk is disposed whereby the flange of the disk braces the peripheral portions thereof and retains the brackets at their predetermined adjusted positions with relation to the drum and in the event that the band is forced into contact with the brackets.

In testimony whereof I affix my signature in presence of two witnesses.

WILLIAM R. LEE.

Witnesses:
 J. F. HOLLEY,
 G. E. MACHEN.